June 21, 1966  H. H. MALONE  3,257,129
ACCOUNTING MEANS
Filed Aug. 5, 1963  5 Sheets-Sheet 1

INVENTOR.
HAROLD H. MALONE
BY
*John H. Widdowson*
ATTORNEY

June 21, 1966  H. H. MALONE  3,257,129
ACCOUNTING MEANS

Filed Aug. 5, 1963  5 Sheets-Sheet 2

INVENTOR.
HAROLD H. MALONE
BY John H. Widdowson
ATTORNEY

June 21, 1966  H. H. MALONE  3,257,129
ACCOUNTING MEANS

Filed Aug. 5, 1963  5 Sheets-Sheet 3

INVENTOR.
HAROLD H. MALONE
BY
John H. Widdowson
ATTORNEY

June 21, 1966

H. H. MALONE 3,257,129

ACCOUNTING MEANS

Filed Aug. 5, 1963

INVENTOR.
HAROLD H. MALONE

BY

ATTORNEY

June 21, 1966  H. H. MALONE  3,257,129
ACCOUNTING MEANS

Filed Aug. 5, 1963  5 Sheets-Sheet 5

INVENTOR.
HAROLD H. MALONE
BY
John H. Widdowson
ATTORNEY

United States Patent Office 3,257,129
Patented June 21, 1966

3,257,129
ACCOUNTING MEANS
Harold H. Malone, 702 Bitting Bldg., Wichita 2, Kans.
Filed Aug. 5, 1963, Ser. No. 299,860
3 Claims. (Cl. 282—23)

This invention relates to accounting means, and more specifically to form means usable in accounting. In a more specific aspect this invention relates to a plurality of form means used in keeping and maintaining accounting records. In a still more specific aspect, the invention relates to a plurality of forms including manifold forms for specific records wherein indicia recorded on the forms is normally written but once and portions of the forms are transferred to other records or accounts in maintaining an accounting system. In another specific aspect the invention relates to the individual construction of a plurality of separable manifold forms, namely, a statement form, a bank check form, an invoice form, and a bank deposit form.

Various accounting systems and means for maintaining accounts are known to the art. The usual accounting system includes a plurality of journals, registers and the like on which entries are manually made from original accounts or records, and entry in these various accounts is a tedious and often time-consuming job and requires that each entry be accurately made to conform with the data from which the entry is made in order to avoid errors in the system which may require considerable amount of time in location of the error and correction of same. In addition, it is often difficult to trace entry in an account in prior art systems. In the systems of the prior art, the multiple transcribing necessary is very conducive to error.

In accordance with the present invention new accounting means and forms for accounting means are provided which overcome the disadvantages of the prior art means, and results in a system wherein duplication normally required in writing an entry on several ledgers, journals, or the like, is eliminated. The accounting system of the invention includes a register having space for a plurality of columns thereon, and a separable form for receipt of data relating to the register. A data recording portion of the form less than the whole is positionable on the register, and the data recording portion of the form when on the register is positionable in overlying relation to a column on the space therefor on the register to thereby eliminate copying of the data from the form onto the register.

The forms for accounting systems or the like of the invention include a plurality of record-keeping leaves positioned in stacked relation and having transfer means between portions thereof operable to transfer data placed on an upper one of the leaves to a lower one of the leaves. The upper one of the record-keeping leaves has a portion thereof with indicia means thereon designating portions for recording of indicia relating to a transaction or the like and a portion of a lower one of the record-keeping leaves is positioned beneath said portion of the upper one of the record-keeping leaves and beneath a portion of the transfer means so that indicia when recorded on the upper one of the record-keeping leaves is transferred to the portion on the lower one of the record-keeping leaves. Another one of the record-keeping leaves has a portion thereof positioned in the form beneath transfer means to receive at least a portion of the indicia when recorded on the upper one of the record-keeping leaves with an intermediate one of the record-breaking leaves being separable from the form and separably usable.

Accordingly, it is an object of the invention to provide new accounting means.

Another object of this invention is to provide a new accounting system.

Yet another object of the invention is to provide a new accounting system including a register or the like having one or more columns thereon, and a separable form for receipt of data relating to the register with a data recording portion of the form being positionable on the register subsequent to entry of data on the form.

Another object of the invention is to provide a new accounting system including registers and forms wherein data entered on the forms is positioned thereon so that a portion of the form can be separated from the form and secured to the register to thereby eliminate copying of the data from the form onto the register or the like.

Still another object of the invention is to provide a new form for accounting systems or the like having a plurality of record-keeping leaves whereby data entered on one of the record-keeping leaves is transferred to portions of others of the record-keeping leaves so that portions of the form can be secured to registers or the like and thereby eliminate copying of data from the forms to the registers in maintaining an accounting system.

Another object of the invention is to provide new manifold forms for an accounting system or the like wherein the forms have key lines for receipt of indicia or data relating to a specific transaction or record with the key line being positioned so that portions of the form can be transferred to ledgers, journals and the like and positioned thereon in stacked relation with the data on the key line being visible and providing the necessary data for maintaining the ledger, journal or the like.

A further object of the invention is to provide forms usable as checks, deposit forms, invoices or statements and the like.

Another object of this invention is to provide a new manifold statement form.

Yet another object of this invention is to provide a new manifold invoice form.

Another object of this invention is to provide a new manifold bank check form.

Still another object of this invention is to provide a new manifold bank deposit form.

Various other objects, advantages and features of the invention will become apparent to those skilled in the art from the following description taken in connection with the accompanying drawings, in which:

FIG. 8 is a view of another preferred specific embodiment of a manifold statement form of the invention wherein one leaf of the form is constructed and adapted to be usable as a subsidiary clients ledger or the like.

FIG. 9 of the drawings is a view of the manifold statement form of FIG. 8 with upper ones of the various leaves being broken away to show the arrangement of the leaves of the form.

FIG. 10 is a view of one of the leaves of the manifold form of FIG. 8 with a portion of the overlying carbon or transfer means being shown thereon.

FIG. 11 is a view of another of the leaves of the manifold form of FIG. 8 illustrating use of same as a subsidiary clients ledger.

Figures 12, 13:
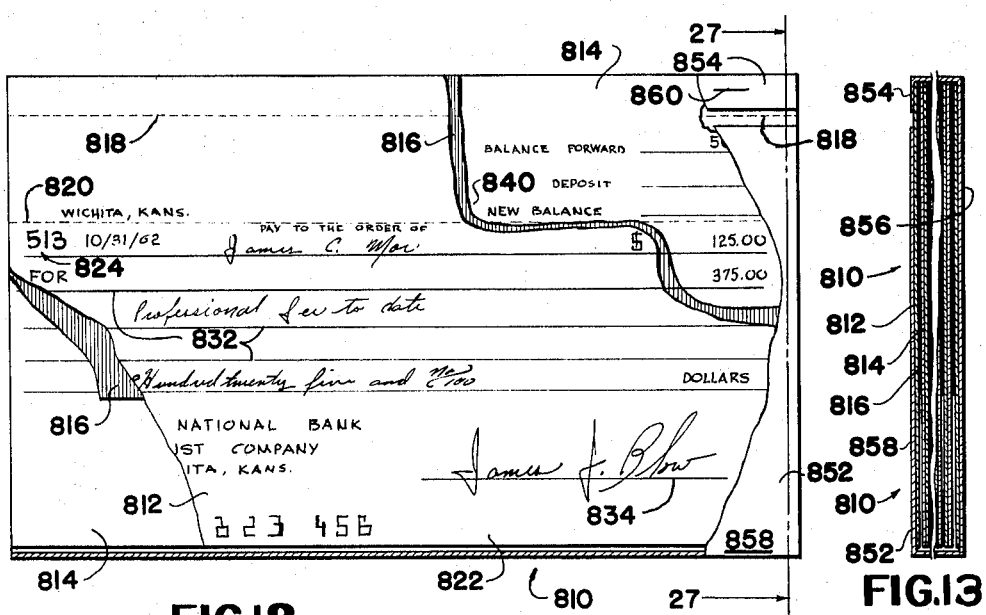

FIG. 12 is a top plan view, partially broken away, illustrating a preferred specific embodiment of a check form of the invention which is especially usable as an individual or personal check book.

FIG. 13 is a cross section view taken along the line 27—27 of FIG. 12.

FIG. 14 is a view, partially broken away, of another preferred specific embodiment of a check form of the invention which is especially usable as a payroll check form or the like.

FIG. 15 is a view, partially broken away, illustrating portions of lower leaves of the check form of FIG. 14.

The following is a discussion and description of preferred specific embodiments of the accounting system and forms of the invention, such being made with reference to the drawings whereon the same reference numerals refer to the same or similar parts and/or structure. It is to be understood that such discussion and description is not to unduly limit the scope of the invention.

Figure 1:
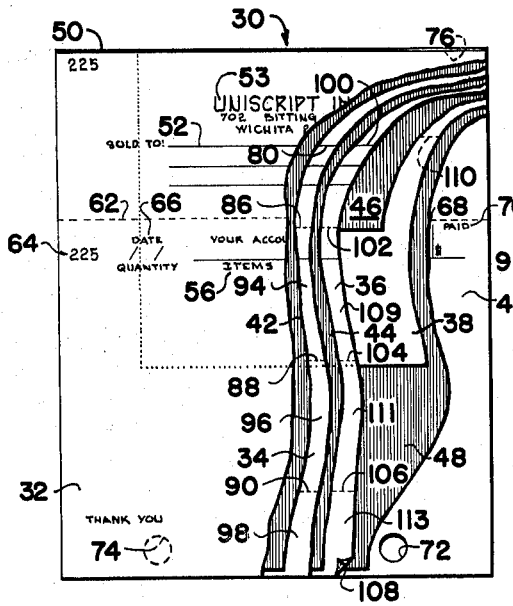
FIG. 1 is a view of a manifold form usable as an invoice-statement or the like with portions of the form being cut away to illustrate various sheets or leaves of the form.
Figure 2:
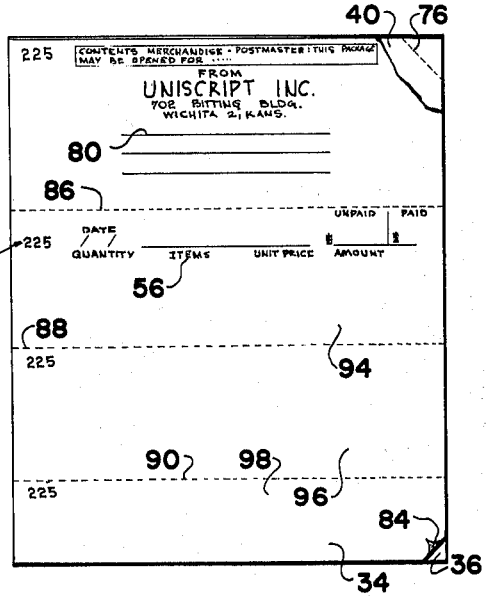
FIG. 2 is a view, partially broken away, showing lower ones of the sheets or record-keeping leaves of the form in FIG. 1.

Referring now to the drawings in detail and to FIGS. 1 and 2 in particular, a preferred specific embodiment of a manifold form usable as an invoice-statement or the like is illustrated generally at 30 and preferably includes five record keeping leaves shown at 32, 34, 36, 38 and 40 which are preferably positioned in stacked relation as illustrated and the form includes transfer leaves 42, 44, 46 and 48 which are interleaved between the record keeping leaves. Preferably, the record keeping leaves and transfer leaves are secured together by suitable means, such as by the use of a gum or adhesive material 50 positioned along the top edge portion of the leaves of the form.

Indicia 53 can be placed on leaf 32 to identify the firm sending the invoice statement. The lower portion of the leaf 32 is desirably provided with a key line and column headings. Means can be provided for separating the upper portion having the rules 52 thereon from the lower portion having the columnar heading and numbered key line thereon and such is illustrated in the drawings by the perforations or dashed line 62 which preferably extends transversely entirely across the upper leaf 32.

Immediately below the perforations on line 62 and above the columnar headings on the lower portion of the leaf 32 is a numbered key line which extends transversely entirely across the leaf and is indicated generally at 64 in the drawings. The key line 64 has indicia thereon identifying the transaction or number of the invoice-statement, the numeral 225 being shown in this instance, and the same numeral 225 is provided in the upper left corner of the leaf 32 to coordinate the upper and lower portions of the leaf after separation of same in use and to serve as a folio number for cross reference. Immediately to the right of the numeral 225 on the key line 64 of leaf 32 a space is provided and indicia designates the space for the date of the transaction, such being shown at 66. Other indicia can be provided on the key line 64, such as the account number or name and items which are normally entered in a journal or the like of an accounting system. By separating the lower portion of the leaf 34 from the upper portion thereof along the line or perforation 86 the key line 92 will be at the upper edge of the lower portion of the form.

The bottom record keeping leaf 40 is preferably the same size as the top leaf 32 and has the same or similar indicia thereon dividing the form into record keeping portions as set for the hereinbefore in connection with leaf 32. Transfer leaf 48 substantially covers leaf 40 and the leaf 40 is preferably used as a duplicate master copy of the transaction recorded on the top leaf 32. Leaf 40 can also be used as a subsidiary ledger page, if desired. The bottom record keeping leaf 40 can be provided with holes or openings 72 and 74 at either edge, preferably at the lower edge portion thereof, which are adapted to receive rings or posts of a binder or the like so that a plurality of leaves 40 can be retained together.

When the form 30 is used as a statement it has been found desirable in use to provide means for indicating payment in full of the statement which are readily visible when a plurality of the record keeping leaves 40 are maintained in a ring binder. For this purpose a row of perforations or indicia can be provided at a corner edge thereof, such as shown at 76 in the upper right edge of leaf 40 in FIG. 2 of the drawings, and when payment is made of the amount shown in the statement this edge can be turned under or separated from the leaf 40 by folding or by cutting or tearing along the line 76. Thus, the duplicate copies maintained in a ring binder can quickly be examined to determine unpaid accounts for billing at the end of the month merely by looking at the corners of the leaves 40 in a binder to determine whether the edge has been removed or folded and, when the edge has not been folded or removed, a new statement is prepared and sent to the client, customer or the like.

The record keeping leaf 34 is best illustrated in FIG. 2 of the drawings and is preferably substantially the same size and shape of the leaf 32. Transfer leaf or carbon paper 42 is positioned between leaves 32 and 34 and is preferably substantially the same size as the leaf 34 so that any indicia entered on the leaf 32 will be transferred to the leaf 34. The leaf 34 preferably has rules or the like 80 on an upper portion thereof positioned immediately below the rulings 52 on leaf 32 to receive the name and address of the client or customer. Preferably, a plurality of columnar headings are provided on the intermediate or lower portion of leaf 34 which can be the same or similar to the columnar headings.

The record keeping leaf 34 preferably has an adhesive 84 on the back face or surface thereof and desirably the adhesive 84 entirely covers the back surface of the leaf. Adhesive 84 is preferably of a water moistenable adhesive or other suitable adhesives which will not adhere to the carbon paper or transfer means 44 when indicia or data is being recorded on the top leaf 32.

A plurality, preferably three spaced and parallel rows of perforations 86, 88 and 90 are provided across leaf 34 and desirably extend transversely entirely across the leaf to define record keeping sections or segments 94, 96 and 98. The upper row of perforations 86 is positioned between the rulings 80 and the indicia 56. A key line 92 on leaf 34 underlies key line 64 on leaf 32 and preferably the row of perforations 86 is positioned immediately above the key line 92 on leaf 34 so that separation of the leaf along the row of perforations 86 results in the key line being in the upper edge portion of the record keeping section 94 of leaf 34. This relation between the row of perforations 86 and the key lines 64 and 92 is quite desirable when using leaf 34 for maintaining registers, ledgers or the like as explained hereinafter.

In use, the upper portion of the leaf 34 above the row of perforations 86 can be separated from the record keeping sections 94, 96 and 98 and secured by means of the adhesive 84 on the back face thereof to mailing piece, a package or the like containing merchandise and is thus usable as a mailing or shipping label. The lower portion of the form or leaf 34 including record keeping sections 94, 96 and 98 can be secured by means of the adhesive 84 in a sales book, accounts receivable ledger, a subsidiary clients ledger or other record keeping means in the manner explained hereinafter. Where only a few items are sold or included on the invoice statement and all of the information recorded below key line 92 is received on section 94, then the record keeping section 98 and/or section 96 can be detached from section 94 along the rows of perforations 88 and 90 and discarded.

Preferably, indicia is provided on each of the record keeping sections 94, 96 and 98 and on the upper portion of the leaf 34 to identify the number of the form of the transaction recorded on the form and in this instance the numeral 225 on each section relates the various sections subsequent to detachment and relates the leaf 34 with the leaf 32 having the same identifying indicia thereon.

The record keeping leaf 36 is positioned beneath and is preferably substantially the same size as the record keeping leaf 34 and carbon or transfer means 44 positioned above record keeping leaf 36 is preferably substantially the same size as the record keeping leaf 36 so that data recorded on the leaf 32 will be transferred by the transfer means or leaf 44 onto the leaf 36. Leaf 36 is substantially the same as the leaf 34 illustrated in FIG. 2 of the drawings.

In use, the upper portion of leaf 36 can be separated from the lower portion thereof by tearing along the row of perforations 102 and the upper portion of the leaf having the rules 100 thereon is retained by the seller and is preferably used as a geographical customer index and can be used for maintaining other records containing the name or address of the customer. The lower portions of the leaf 36 beneath the row of perforations 102 can be separated into record keeping sections 109, 111 and 113 by tearing along the rows of perforations 104 and 106 and these record keeping sections can be inserted and secured in a customer's ledger, sales book, accounts receivable ledger, subsidiary client ledger, or other record keeping means. Preferably, the various sections of the leaf 36 are provided with identical identifying numerical indicia which corresponds to the indicia on the top leaf 32, in this instance the numeral 225 being the identifying numerical indicia.

The record keeping leaf 38 of form 30 is positioned between transfer or carbon leaves 46 and 48 and preferably transfer leaf 46 is of size to cover the upper portion of the leaf 38 as illustrated in FIG. 1. Desirably the record keeping leaf 38 is somewhat smaller than others of the record keeping leaves of form 30 and is preferably of size to have a portion positioned beneath the rulings 52 on leaf 32 and beneath the key line 64 on leaf 32. Transfer leaf 46 is of size relative to leaves 32 and 38 so that the lower edge of leaf 46 is above the key line 64 so that indicia recorded on rulings 52 of the leaf 32 relative to the name and address of the customer is transferred to the leaf 38 and data recorded on key line 64 and lower portions of leaf 32 is not transferred to leaf 38.

Leaf 38 is preferably provided with a single row of perforations 110 which extend transversely entirely across the leaf 38 and the row of perforations 110 is preferably positioned to be above the rulings 52 on leaves 32. Thus, after data is recorded on the leaf 32 the leaf 38 is separable from the form and the portion above the row of perforations 110 can be removed by tearing along the row of perforations and the lower portion of leaf 38 then contains only the name and address of the purchaser. This lower portion of the leaf 38 can be used as a customer's index or for other record-keeping purposes. Preferably, a portion of the lower portion of leaf 38 is provided with identifying numerical indicia which is the same as the indicia on key line 64 of leaf 32 for coordination of the transaction among the various record-keeping leaves, and in the form 30 illustrated in the drawings the numeral 225 is placed on leaf 38.

In use, the invoice-statement form 30 can have data recorded on the leaf 32 thereof setting forth the transaction involved with data relating to the name and address of the customer or client preferably being placed on the rulings 52 and being transferred through the carbon or transfer leaves 42, 44, 46 and 48 onto each of the lower record-keeping leaves 34, 36, 38 and 40. On key line 64 information is transferred through the underlying transfer leaves to record-keeping leaves 34, 36 and 40. This information is not transferred to the record-keeping leaf 38 since transfer leaf 46 terminates above the key line 64. The items of the billing or purchase are transferred to the record-keeping leaves 34, 36 and 40.

When the recording of data on the top leaf 32 has been completed the record-keeping leaves and the transfer leaves are separated from each other along the gum or adhesive 50 at the upper edge of the form or at the perforations provided for separation and the transfer leaves are destroyed and the record keeping leaves are then usable separately as desired. Preferably, the top leaf 32 is sent to the client or customer. The record keeping leaves 34 and 36 are preferably separated along the rows of perforation 86 and 102, respectively, and the upper portion of record keeping leaf 34 can be used as a mailing label or the like. The lower portions of leaf 34 are insertable into the sales book of the seller or in other suitable accounts of record.

The record keeping leaf 38 is separated into sections along the row of perforations 110 and this leaf can be placed in a customer's index as a card file. The record keeping leaf 40 is a duplicate copy of the original or top record keeping leaf 32 and can be received by rings in a binder or the like by using the holes or openings 72 and 74 along the lower portion of the leaf 40 and thereby maintain a master copy of the entire transaction. When the account is paid in full a corner of the leaf 40 can be folded back or removed, such as by cutting along the dashed line 76, to thereby indicate payment of the account. This is quite desirable when a plurality of the duplicate copies or leafs 40 are maintained in a ring binder.

Figure 3:
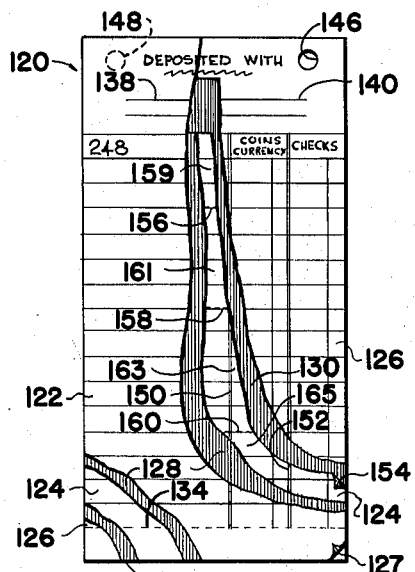
FIG. 3 is a view, partially broken away, illustrating a preferred specific embodiment of a manifold deposit form of the invention.

FIG. 3 of the drawings illustrates a preferred specific embodiment of a manifold deposit form of the invention. The form is shown generally at 120 and preferably includes three elongated record keeping leaves 122, 124 and 126 which are positioned in stacked and overlying relation as illustrated in the drawings and two elongated transfer means or carbon leaves 128 and 130 are interleaved between the record keeping leaves and are positioned to overlie record keeping portions of the leaves 124 and 126. The record keeping leaves and carbon or transfer leaves are preferably secured together along the lower edge portions thereof by adhesive or the like shown at 127 on leaf 122. The record keeping leaves 122, 124 and 126 are desirably provided with rows of perforations 132, 134 and 136 respectively, which extend transversely entirely across the record keeping leaves along the lower edge portion thereof and are desirably positioned above the adhesive securing the leaves together so that in use the record keeping leaves can be separated from the transfer leaves by tearing along the rows of perforations 132, 134 and 136 with the transfer leaves and the lower edge portion of the record keeping leaves being disposable.

The record-keeping leaves 122 and 126 preferably have the same or substantially the same indicia thereon and are preferably ruled at the upper portions thereof as shown at 138 and 140, respectively for the name and address of the depositor or for entry of the name of the account as it appears on the bank records.

The longitudinal columns on the record-keeping leaves 122 and 126 are positioned in overlying relation so that data entered on the leaf 122 will be transferred by transfer leaf 130 to the record-keeping leaf 126. The record-keeping leaf 126 is preferably provided with holes or openings 146 and 148 at an upper edge portion thereof so that the leaf 126 can be retained in a ring binder or the like with the holes receiving the rings of the binder.

The record-keeping leaf 124 is preferably shorter than the leaves 122 and 126 and extends upwardly from the row of perforations 134 to a position immediately beneath the rulings 138 and 140 and at the upper edge of the longitudinal columns of the record-keeping leaves 122 and 126. Preferably, adhesive means 154 is positioned on the back flow or surface of the leaf 124 and desirably completely covers the leaf so that the leaf can be secured to other record keeping means in the manner described hereinafter.

The leaf 124 is desirably provided with a plurality of row of perforations to separate the leaf into record keeping sections. As illustrated in the drawings three rows of perforations 156, 158 and 160 are provided and such desirably extend transversely entirely across the leaf, the rows of perforations being spaced from each other and from the row of perforations 134 along the lower edge of leaf 124. The rows of perforations 156, 158, 160 and 134 divide the leaf into record keeping sections 159, 161, 163 and 165.

Each of the record keeping leaves 122, 124 and 126 are preferably provided with identifying indicia so that when separated the leaves are still coordinated and can be cross indexed. For this purpose numerical indicia, such as the numeral 248 can be provided, and preferably this identifying numeral appears on all three leaves and is positioned in overlying relation.

The transfer leaves 128 and 130 are preferably wide enough to completely cover the width of each of the underlying record keeping leaves and the transfer leaf 128 which overlies record keeping leaf 124 is preferably substantially the same length as the record keeping leaf 124 and transfer leaf 130 is of sufficient length to overlie the rulings 140 at the upper portion of leaf 126 and extends downwardly therefrom to the lower edge of the form.

When using the form, the name of the account or depositor is placed on the rulings 138 of record keeping leaf 122 and is transferred by the transfer means or leaf 130 to the record keeping leaf 126. The items of deposit are then itemized and in the explanation column the source of the funds or other data can be inserted on the upper leaf and transferred to the record keeping leaves 124 and 126. When all items of deposit are listed on the form the record keeping leaves can be separated from the transfer leaves by tearing along the rows of perforations 132, 134 and 136 and the top record keeping leaf 122 is used when making the deposit and the bottom record keeping leaf 126 is retained in the depositor's files as a copy of the deposit. The intermediate record keeping leaf 124 can be reduced in length to conform to the items listed and the unused sections removed by tearing along the row of perforations 156, 158 or 160 and the filled in portion of the record keeping sections of leaf 124 can be secured to a deposits register or the like by moistening the adhesive 154 and securing the sections to a deposits register in the manner explained more fully hereinafter. Lower ones of the record-keeping sections 159, 161, 163 and 165 of leaf 124 which are blank and not needed can be discarded.

Figure 4:
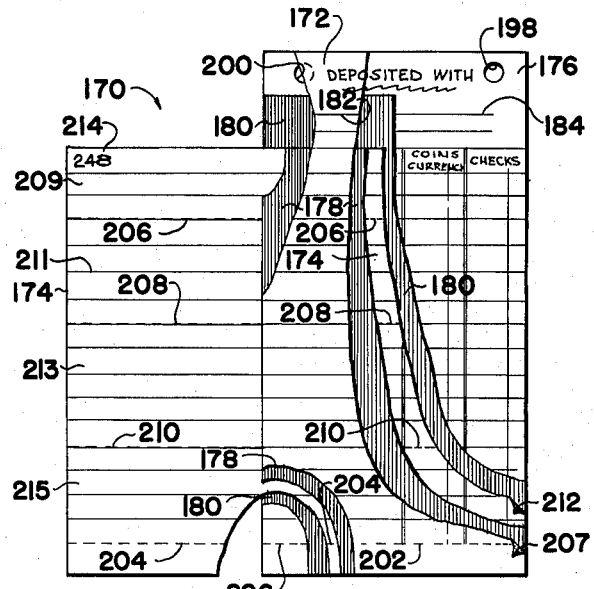
FIG. 4 is a view, partially cut away, illustrating another preferred specific embodiment of the manifold deposit form of the invention.

Another preferred specific embodiment of a manifold deposit form is illustrated in FIG. 4 of the drawings and is shown generally at 170. The form 170 includes three record-keeping leaves 172, 174, and 176 which are positioned in stack relation with the right edge of each of the record-keeping leaves being aligned. Preferably, the record-keeping leaf 174 is substantially wider than the other of the record-keeping leaves and extends beyond the left edge of the leaves 172 and 176. Transfer leaves 178 and 180 are interleaved between the record-keeping leaves and overlie record-keeping portions of leaves 174 and 176 beneath the leaf 172. The record-keeping leaves 172 and 176 are ruled as shown at 182 and 184 respectively to provide a space for entry of the name of the account as it appears on the bank records.

Leaf 176 is preferably provided with holes or openings 198 and 200 at the upper edge portion thereof to receive rings in a binder or the like to maintain the leaf 176 as a duplicate of the deposit slip.

The record-keeping leaves 172, 174, and 176 are preferably provided with transversely extending rows of perforations 202, 204, and 206, respectively, position adjacent and in spaced relation to the lower edge of the form. The record-keeping leaves and transfer leaves are preferably secured together between the rows of perforations 202, 204, and 206, and the lower edge of the form by an adhesive 207 so that the record-keeping leaves can be separated by tearing along these row of perforations.

Preferably, record-keeping leaf 174 is provided with three additional spaced rows of perforations 206, 208 and 210 which extend transversely from one edge portion of the leaf to the other edge portion thereof and are positioned in spaced relation to the row of perforations 204 so that the leaf can be separated into a plurality of separate record-keeping segments or sections 209, 211, 213, and 215 for insertion into a deposits register or other suitable accounting means in a manner explained more fully hereinafter. In order to facilitate insertion of the record-keeping sections of leaf 174 onto another form or record, adhesive means 212 is provided on the back surface of the leaf and preferably cover the entire back surface, thereof.

In use, the deposit form is filled out in connection with the deposit form 120 and the additional space provided by extending the leaf 174 to the left of the other record keeping leaves provides additional space for explanation of the deposits which eliminates copying or separately inserting this explanation data in a deposits register or the like. In other words, once the data is entered on the leaf 174 there is normally no need for duplicating this data in a deposits register, thus eliminating need for recopying and errors that may occur as a result of the recopying normally required with prior art forms. Preferably, each of the record keeping leaves of the form 170 are provided with identifying indicia, such being illustrated at 214 by the numeral 248 which is preferably contained on the same line of each of the forms.

Figure 5:
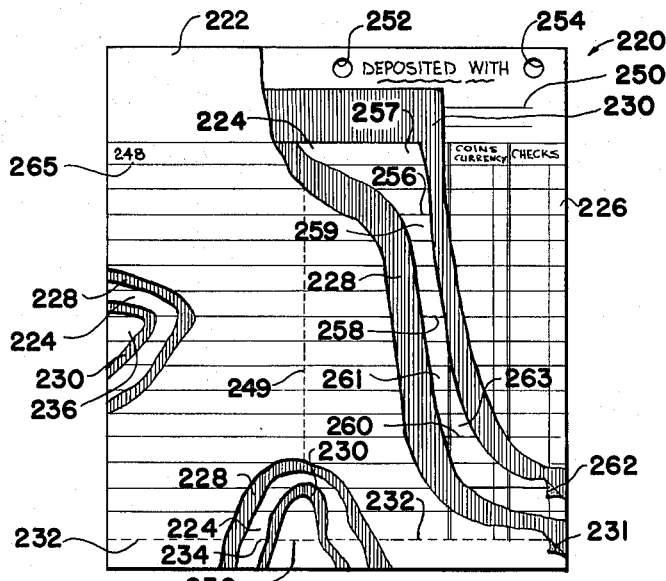
FIG. 5 is a view, partially cut away, illustrating a still further preferred specific embodiment of a manifold deposit form of the invention.

FIG. 5 of the drawings illustrates another preferred specific embodiment of a deposit form of the invention with such being shown generally at 220. Form 220 includes three record keeping leaves 222, 224, and 226 which are positioned in overlying relation and preferably are of substantially the same size. Transfer leaves 228 and 230 or other transfer means are interleaved between the record keeping leaves. The record keeping leaves and transfer leaves are preferably secured together along the lower edge portion thereof by suitable means, such as adhesive means 231. The record keeping leaves 222, 224 and 226 are preferably each provided with a transverse row of perforations 232, 234 and 236, respectively, which are positioned above the area in which the leaves are secured together so that the record keeping leaves can be detached from each other and from the form by tearing along the rows of perforations and discarding the lower edge portion of the record keeping leaves and the transfer leaves.

The record keeping leaves 222, 224 and 226 are preferably substantially wider than the record keeping leaves of FIG. 3 and this additional width is preferably provided so that a substantially wider explanation column can be provided. The columns are provided by rulings on each of the record keeping leaves. The leaf 222 can be provided with a row of perforations 249 which extends vertically the length of the leaf so that the leaf can be narrowed to the width of a conventional deposit slip before marking the deposit.

Holes or openings 252 and 254 are provided on the upper portion of the leaf 226 to receive rings in a binder or the like for retaining a plurality of the leaves 226.

The record keeping leaf 224 is desirably provided with transversely extending rows of perforations as shown at 256, 258, and 260 which extend entirely across the record keeping leaf 224 in spaced relation to each other and the row of perforations 234 to provide means for separating the record keeping leaf into a plurality of record keeping sections 257, 259, 261 and 263, with such being separable and insertable into a register or the like. Desirably, record keeping leaf 224 has adhesive means 262 positioned on the back face or surface thereof and desirably the adhesive means substantially covers the entire back face thereof.

The use of the form 220 is substantially the same as that described hereinbefore in connection with the deposit forms of FIGS. 3 and 4. By making the upper leaf 222 relatively wide or wider than the usual deposit slip, the explanation column can be more fully filled out at the time the deposit is made without the necessity of separately entering data on the intermediate record-keeping leaf. Preferably, identifying indicia, such as the numeral 248 shown at 265 on the top left side of the leaf 222, appears on each of the record-keeping leaves of the form so that the leaves may be traced or co-ordinated subsequent to separation.

Figure 6:
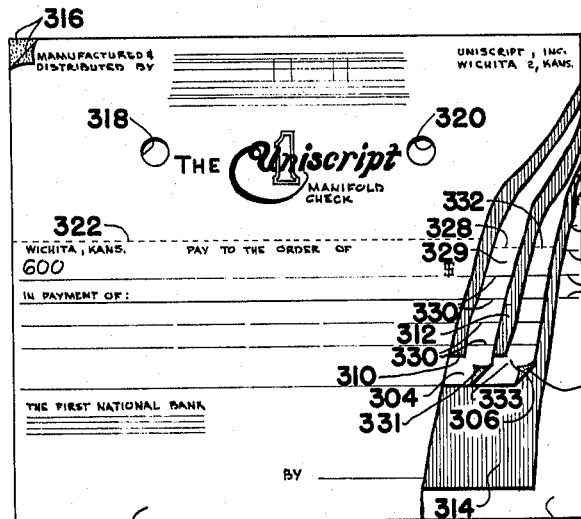
FIG. 6 is a view, partially cut away, illustrating a preferred specific embodiment of a manifold check form of the invention.
Figure 7:
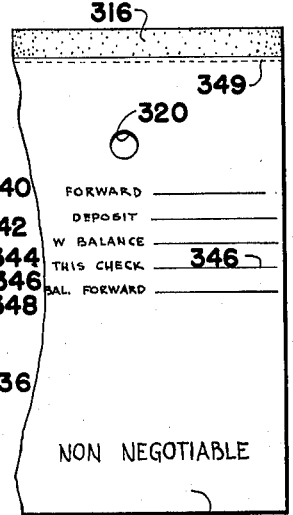
FIG. 7 is a partial view of one of the record-keeping leaves of the form of FIG. 6.

Referring now to FIGS. 6 and 7 of the drawings in particular, a preferred manifold check form of the invention is illustrated generally at 300 and preferably includes four record-keeping leaves 302, 304, 306, and 308 which are preferably positioned in stacked relation and have transfer means 310, 312, and 314 positioned between adjacent ones of the record-keeping leaves. Desirably, the record-keeping leaves and transfer means are secured together on the top or upper edge portion of the form by adhesive 316 or the like which is positioned between adjacent ones of the leaves. In some instances, it will be desirable to provide gum or other suitable means as shown in 50 in FIG. 1 for securing the leaves of the form together. Preferably, spaced holes or apertures 318 and 320 are provided and positioned in the upper portion of the form to receive rings of a binder or the like so that the check form can be retained therein. Also, the leaf 308 can be retained in the ring binder after the form has been filled in and appropriate distribution made of the other leaves of the form.

The portion of the record keeping leaf 302 between the row of perforations 322 and the lower edge of the leaf has indicia arranged thereon in such a manner as to set forth a blank check form. Leaf 302 has identifying numerical indicia, such as shown at 325 by the numeral 600, and the same identifying indicia preferably appears on the other of the record keeping leaves 304, 306, and 308 and is desirably located on these leaves immediately beneath the identifying indicia on the top leaf 302 and can be imprinted at one press operation on all of the leaves by means of the transfer means 310, 312 and 314.

The record-keeping leaf 304 can be provided with a row of extending perforations 328 which desirably extends transversely entirely across the leaf and defines a lower record-keeping section 329. The row of perforations 328 is positioned beneath the row of perforations 322 on leaf 302 and above the top ruling on the lower portion of the leaf 302 so that data entered on the top line or ruling is transferred to the upper edge portion of record-keeping section 329. Sections 329 of leaf 304 desirably has a plurality of lines or rulings 330 thereon which are positioned beneath rulings 324 on leaf 302. Section 329 of leaf 304 desirably has adhesive means 331 covering the back surface thereof.

The leaf 306 is preferably identical in construction to the leaf 304 and includes a row of perforations 332 extending transversely entirely thereacross and positioned immediately beneath the row of perforations 328 on leaf 304 to define a record-keeping section 333. Leaf 306 has rulings thereon which are positioned beneath rulings on leaves 302 and 304, respectively. Adhesive 336 desirably covers the entire back face of section 333 of leaf 306. In use, the leaves 304 and 306 are separable the rows of perforations 328 and 332 after the check has been filled out on leaf 302 and the record-keeping sections 329 and 333 are insertable into a check register, payroll register, or other record-keeping means in a manner explained more fully hereinafter.

The record-keeping leaf 308, positioned at the bottom of the form 300 is preferably provided with indicia along the right side portion thereof for maintaining the balance of the bankbook. Preferably, the lines or rulings are positioned so that the line or ruling 346 is immediately beneath right portion of the top line on leaf 302 so that when the amount of the check is written on the top ruling on leaf 302 such is transferred by the transfer means or carbon paper 314 to the line or ruling 346 to thereby eliminate the need for separately copying or entering this amount on the leaf 308.

The transfer leaves 310, 312 and 314 are preferably of size to overlie the record-keeping portions of the record-keeping leaves 304, 306 and 208. Thus, the transfer leaves 310 and 312 can be somewhat shorter than the transfer leaf 314 since the record-keeping leaves 304 and 306 are also preferably shorter than these record-keeping leaves.

When the top record keeping leaf 302 has been fully filled in the lower portion of leaf 302 can be separated from the upper portion by tearing along the row of perforations 322 with this lower portion being used as a check and sent to the payee. The record keeping portions 329 and 333 of leaves 304 and 306 can be separated from the form and secured to registers or other record keeping means and thereby eliminate the need for copying data relating to the check on the register or the like.

As will be seen from the drawings and the foregoing description, the upper line or ruling of the leaves 304 and 306 contain the important and necessary data for entering in a check register or the like and such is on the upper portion of the record keeping sections or portions of the leaves 304 and 306 when same are separated from the upper portion of the leaves along the rows of perforations 328 and 332, thus providing a key line which permits shingle stacking of the leaves 304 and 306 with only this upper line or additional lines as desired being visible on a register or the like. The leaf 308 is retained in the files as a master copy of the check and the balance of the check book can be maintained on the rulings or lines 340–348 thus eliminating the usual check stub. Holes or openings 318 and 320 permit retention of leaves 304, 306 and 308 in a ring binder or the like after after removal of leaf 302 so that the leaves 304, 306 and 308 can be separately dispersed at a convenient time.

FIGS. 8–11 illustrate another preferred specific embodiment of a manifold statement form of the invention and the form is shown generally at 600. Form 600 preferably includes record keeping leaves 602, 604, 606, 608 and 610. Transfer means are desirably positioned between the record keeping leaves and, as illustrated in FIGS. 9 and 10, the transfer means can be carbon or transfer leaves 612, 614, 616 and 618. In the form 600, as well as in others of the manifold forms of the invention, other suitable transfer means can be provided. For example, pressure sensitive substances or other suitable means known to the art can be deposited on the back face or surface of upper ones of the record keeping leaves so that indicia recorded on the upper ones of the record keeping leaves is transferred to lower ones of the record keeping leaves. Paper having such transfer means thereon is commercially available from the National Cash Register Company. The paper is commonly called NRC paper, and it functionally is referred to as no-carbon-required paper. Also usable is a paper treated by a hot wax electronic process and sold by the Hot Spot Carbonizing Corp. of Chicago, Illinois which permits selective positioning of the transfer means on the paper.

Holes or openings 620, 622, 624 and 626 are preferably provided through all of the leaves of the form 600 so that a plurality of forms 600 can be maintained in a ring or post binder, etc. If desired, the leaves of the form 600 can be secured together along the upper edge portion thereof by adhesive, gum material or other suitable means as explained hereinbefore in connection with other ones of the forms of the invention.

The top record keeping leaf 602 desirably has a row of perforations 628 extending transversely entirely thereacross and positioned beneath the holes or openings 620–626. The portion of the form above the row of perforations 628 on leaf 602 can be used to identify the source of the form, for instructions in use of the form, etc. Leaf 602 desirably has a key line 630 which includes identifying indicia 632, such being illustrated by the numeral 440 on leaf 602. The same identifying indicia appears on other record keeping leaves of the form. The leaves are preferably stacked so that the identifying indicia can be imprinted thereon by one operation through the use of the transfer means. Key line 630 further includes space thereon for the date as shown at 634, for the name of the firm or individual being billed as shown at 636, a space for the amount of the expenses being billed as shown at 638, a space for the services or goods being billed for as shown at 640, and a space for the total charges billed as shown at 642. Immediately above key line 630 and above the portion 642 thereof, a ruling or line 644 is provided to enter the previous balance due, if any, from the client or customer being billed.

The portion of the leaf 602 beneath the indicia 654 is preferably divided into columns and suitable column heads can be provided.

As will be apparent from examination of FIGS. 9 and 10 of the drawings, the carbon or transfer leaves are of length and are positioned in the form so that all of the information entered on the top leaf 602 is transferred to the bottom leaf 610 and information entered on the key line 630 of leaf 602 is also transferred to leaves 604 and 606 with the portion of the data recorded on leaf 602 beneath the key line 630 not being transferred to leaves 604 and 606. The length of transfer leaf 616 as illustrated in FIG. 10 is such that the information recorded on leaf 602 between the lower ruling 646 and the upper portion of the form is transferred to the record keeping leaf 608 and the leaf 608 can be used as a geographical index or for other suitable uses. Leaf 608 preferably has a single row of perforations 670 thereon which extend transversely entirely thereacross so that leaf 608 can be divided into a lower record keeping section for retention in the customer's index or the like with the upper portion of the leaf 608 being discarded after removal of the lower portion thereof.

The information entered on key line 630 of top leaf 602 and transferred to the record keeping leaf 604 and 606 includes the necessary information for entry in the accounts receivable register and subsidiary client's ledger. The record keeping leaf 604 desirably has a row of perforations 674 thereon which extends transversely entirely thereacross and is preferably positioned immediately above the indicia received from the key line 630 so that the leaf 604 can be separated into two sections by tearing along the row of perforations 674 to provide a record keeping section 676 which has the information from key line 630 at the top line or edge portion thereof. Record keeping section 676 preferably has adhesive means 678 on the back surface thereof which desirably covers at least the record keeping section 676 thereof and the adhesive 678 can be used in securing the record keeping section 676 to an accounts receivable register or the like.

The leaf 606 is preferably of the same or similar construction as leaf 604 and includes a row of perforations 680 which extends transversely entirely across the leaf with a row of perforations 680 being immediately beneath the row of perforations 674 so that information reported on key line 630 of leaf 602 is positioned immediately beneath the row of perforations 680. Leaf 606 can be separated into two portions by tearing along the row of perforations 680 with the lower portion 682 being a record keeping section. Section 682 of leaf 606 preferably has adhesive means 684 secured to the back surface thereof so that the adhesive can be used to secure section 682 to other papers such as a subsidiary client's ledger sheet such as the leaf 610 of form 600 in a manner described hereinafter.

The record keeping leaf 610 of the form 600 is preferably provided with a row of perforations 690 at the upper edge thereof which extends transversely entirely thereacorss and desirably the row of perforations 690 is positioned between the holes 620, 622, 624 and 626 and the upper edge of the leaf 610. Another row of perforations 691 can be provided beneath holes 620, 622, 624 and 626 so that the portion of leaf 610 having the holes therethrough can be removed when the leaf is to be retained in means other than ring binders, posts or the like. After the data has been recorded on the leaf 602 and the form 600 separated into segments, the upper edge portion of leaf 610 can be separated from the lower portion thereof by tearing along the row of perforations 690 or along the row of perforations 691.

Leaf 610 includes a key line 692 which is positioned in the form immediately beneath the key line 630 on leaf 602 and key line 692 contains identical information to the key line 630 after filling in of the form.

For example, columns 712, 714, 716 and 718 are illustrated in FIGS. 9 and 11 and are preferably headed "Folio," "Debit," "Credit," and "Balance." As will be observed from the figures, the columns 712, 714, 716 and 718 run transversely across the lower portion of leaf 610 and they are positioned so that a plurality of the record keeping sections 682 from leaf 606 of form 600 can be secured to leaf 610 with the right edge portion of the section 682 being aligned with the right edge portion of column 714 so that the amounts to be debited to the account are located in columns 714. Also, it will be observed that the sections 682 are of length or size relative to the indicia and layout on leaf 610 so that the left edge of the sections are positioned immediately beneath the key line 692. Also, the adhesive 684 on the back of section 682 is preferably moistened along the lower right edge portion only so that the left portion of each of the record keeping sections can be lifted to examine the data or indicia, if desired. If additional space or columns are required, the back face of leaf 610 can be ruled into columns.

When the leaf 610 is used as a subsidiary client's ledger, it is desirable to retain same in a ring or post binder or the like by the holes or openings 620, 622, 624, and 626 receiving rings or posts in the binder and one of the lower edge portions of the leaf 610 can be removed to indicate payment in full of the account. For this purpose, a row of perforations or indicia 722 is provided in the lower right edge of leaf 610 and when the account has been paid in full, leaf 610 can be cut or separated along the row 722 or the triangular corner portion 723 can be folded backwardly along the line 722 to designate payment of the account so that when the end of a billing period occurs and it is desired to bill unpaid accounts, the unpaid accounts can be quickly located in the subsidiary client ledgers by leafing through the various leaves and locating accounts wherein the lower right edge portion beneath the row 722 has not been cut or folded back. When the triangular corner portion 723 is folded back to indicate payment of the account, it is desirable to provide a slot 725 to receive the edge of the leaf and hold portion 723 in folded position.

In some instances, it will be desired to maintain the subsidiary client ledger. In such instance, the leaf 610 can be of size, shape, and structure and have indicia thereon which is the same or similar to the leaf 602 and leaf 610 will then be retained as a master or duplicate copy of the statement.

The statement copies are the record keeping sections from one of the statement forms of the invention, such as the sections 676 or 682, of leaf 604 or leaf 606 of the statement form 600, FIGS. 8–11, the section 676 being illustrated in the drawings. Preferably, the sections 676 or 682 are shingle stacked or positioned in overlapping relation as illustrated in FIG. 11 with the key or top line of each section being visible. This stacking can be achieved by moistening the lower edge only of adhesive 678 or 684 on section 676 or 682 and pressing the section 676 or 682 onto form 370.

Another preferred specific embodiment of a manifold check form of the invention is shown generally at 810 in FIGS. 12 and 13 and includes two record keeping leaves 812 and 814 which are positioned at the top and bottom, respectively, of the form and suitable transfer means, such as the transfer leaf 816 is desirably positioned between the record keeping leaves and preferably terminates in spaced relation to the lower edges thereof as illustrated in the drawings. The record keeping leaves 812 and 814 are substantially the same size and shape and are positioned in overlying or stacked relation.

The record keeping leaf 812 preferably has a first row of perforations 818 positioned at the top portion of the leaf and extending entirely thereacross in spaced relation to the upper edge of the leaf.

The portion of the leaf 812 between the row of perforations 818 and the lower edge of the leaf is designated 822 and has indicia thereon which defines or provides a blank check and preferably includes a key line 824 which is positioned immediately adjacent and beneath the dotted line 820 and receives indicia containing information indicating the key number or check number, such as the number 513 illustrated in FIG. 12. Preferably, the transfer leaf or means 816 terminates between the lower rulings 832 and the ruling 834 and is positioned so that the signature on ruling 834 is not transferred by the transfer means 816 to the lower leaf 814.

The record keeping leaf 814 preferably has a single row of perforations 840 extending entirely thereacross and positioned in an intermediate portion thereof beneath the dotted line 820 on the leaf 812 so that the leaf 814 can be separated into record keeping sections with the portion of the leaf between the row of perforations 840 and the lower edge of the form having on the upper edge portion thereof the data entered on the key line 824 and transferred by the transfer means 816 to the leaf 814. This portion of the leaf or form can be used for maintaining records, entry in a check register, or for other suitable purposes.

The leaf 814 is desirably provided with an adhesive on the back side thereof as discussed hereinbefore with other leaves and with the front side of the leaf having means for maintaining the account balance and includes indicia and rulings as illustrated in FIG. 12.

Preferably, a plurality of the forms 810 are provided and are numbered in sequence and desirably the numbering sequence runs from the lower form of the group or the series to the upper form although the reverse numbering can be used if desired. Thus, the bottom check or form is filled out first and data entered thereon is not transferred by the transfer means of the forms to other blank copies of the form. When the numbering sequence is from the top to bottom, then suitable means are desirably placed between forms in the group of forms so that data entered on upper ones of the forms 810 will not be transferred to lower leaves of lower ones of the forms by the transfer means 816.

Preferably, a cover is provided for one or a plurality of the forms 810. A suitable cover is illustrated generally at 852 and includes an edge portion 854 positioned along the upper edge portion of leaf 812 and extending along the upper edge portion of the form and the cover also includes a back portion 856 which extends along the back of the forms and is bent along the lower edge of the back and connected to a front or overlying portion 858 with the front 858 preferably extending upwardly to be in abutting engagement with or adjacent to the lower edge of the portion 854 of the cover. In use, suitable fastening means, such as staples 860, FIG. 12, can be used to secure the cover and forms 810 in assembled relation and the front 858 of the cover 852 can be inserted between adjacent ones of the forms in a group of forms in the cover to prevent transfer of indicia from an upper one to a lower one of the forms during filling out of the check form.

The check form 810 of the invention is particularly desirable for use by an individual in maintaining his personal account, although it also can be used for small businesses, self-employed individuals and others who prefer a copy of the check written and the portion of leaf 814 beneath perforations 840 can be detachable and secured to a check register or the like as explained in connection with the check register forms or sales journals of the invention.

FIGS. 14 and 15 of the drawings illustrate another preferred specific embodiment of a manifold check form of the invention which is shown generally at 870. The form 870 includes four record keeping leaves 872, 874, 876 and 878 which are positioned in stacked relation and three transfer leaves or means 880, 882 and 884 are interleaved between the record keeping leaves so that data or indicia written on upper ones of the record keeping leaves can be transferred through underlying portions of the transfer leaves or means to other of the record keeping leaves. Preferably, the record keeping leaves and transfer leaves are secured together along an upper edge portion thereof by use of suitable adhesive means 886 and two spaced holes or apertures 888 and 890 can be provided beneath the adhesive means 886 to receive posts or rings to hold the form.

The top record keeping leaf 872 preferably has a first row of perforations 892 extending transversely entirely thereacross and preferably located in the upper portion of the leaf beneath the holes or apertures 888 and 890. A second row of perforations 894 is preferably provided and extends transversely entirely across the leaf 872 and is positioned in spaced and generally parallel relation to the row of perforations 892. The portion of the leaf 872 between the rows of perforations 892 and 894 preferably is used for computing the amount of the check to be paid and, when the check is for an employee, indicia can be provided as shown in FIG. 14 for computing the amount of the check.

Preferably, the record keeping leaves 874 and 876 are of like size and construction and include rows of perforations 934 and 936, respectively, which are positioned immediately beneath the row of perforations 892 on leaf 872 and other rows of perforations 938 and 940, respectively, which are positioned in overlying relation and which are positioned to be between the row of perforations 894 and the key line on leaf 872. Thus, data or indicia entered on leaf 872 appear immediately beneath the rows of perforations 934 and 936 and beneath the rows of perforations 938 and 940. This area on the leaves 874 and 876 can be referred to as key lines and such is illustrated by the numerals 942 and 944 for leaf 874 and at 943 and 945 on the leaf 876. The key lines on leafs 874 and 876 include identifying indicia, such as the numeral 105 shown in the drawings in FIG. 15, to thereby coordinate the sections or leaves with the top leaf. This same identifying indicia also appears on the bottom leaf 878 so that when the leaves are detached they can be coordinated or cross indexed and this numeral can be used as a folio number as explained in connection with the other forms of the invention.

The rows of perforations 934 and 938 on leaf 874 and like perforations 936 and 940 on leaf 876 provide means for separating the leaves into record keeping sections which are securable to registers or the like as explained hereinbefore, the record keeping sections being usable on payroll registers, check registers and the like.

The record keeping leaf 878 is positioned at the bottom of the form and has a row of perforations 950 extending thereacross at the upper edge portion thereof immediately beneath the adhesive means 886, and this leaf is substantially covered by the transfer means 884 so that substantially all indicia entered on the top record keeping leaf 872 is transferred to the lower record keeping leaf 878.

While the check form 870 of FIGS. 14 and 15 has been described in connection with payroll checks, it will be understood by those skilled in the art that the indicia provided between rows of perforations 892 and 894 on leaf 872 can be varied so that the check can be used for other applications and separated into segments or portions for appropriate uses.

The various record keeping forms of the invention as shown in the drawings and described herein have carbon or transfer leaves interleaved between the record keeping leaves and it will be understood by those skilled in the art that other suitable transfer means can be used, including pressure sensitive transfer means positioned on the back surface of a record keeping leaf and operable to transfer to an underlying leaf indicia recorded on the upper leaf. Also, while pre-gummed paper is preferably used for the record keeping sections to be secured to other of the forms, registers, or the like, plain paper can be used in some instances with the gum or adhesive being secured by a brush or other suitable means immediately prior to securing the record keeping sections in place on the registers, journals, or the like. Ordinary paste pen applicators can be used for gluing the strips to the page when ungummed or plain paper is used.

By eliminating the necessity for duplication of many entries such as in prior art bookkeeping systems, a substantial savings in time normally required for record keeping is achieved. In addition, the elimination of writing data from one book or entry to another reduces the possibility of error and makes bookkeeping less burdensome. Furthermore, with the bookkeeping systems of the invention and forms associated therewith, employees with only a rudimentary knowledge of debits and credits or bookkeeping systems are able to assemble the various forms and maintains the books of record in the system. From the books or records illustrated and described, more formal balance sheets and financial statements can be prepared in the usual manner when desired. Also, difficulty in maintaining related accounts in "control" is reduced, since use of duplicate or carbon copies of forms of original entry in various accounts or ledgers reduces errors frequently occurring by entry of different amounts in related accounts with an error of this nature in prior art systems being very difficult to locate.

While the invention has been described in connection with preferred specific embodiments of the forms and accounting system of the invention, it will be understood by those skilled in the art that various modifications or changes can be made within the scope of the claims.

I claim:
1. A plural sheet manifold pack comprising, in combination, an upper sheet for entry of indicia and having thereacross a portion having key indicia thereon and space for entering bookkeeping information, a lower sheet to receive indicia entered on said upper sheet, transfer means overlying said lower sheet, intermediate record-keeping sheet means having adhering means on the back surface thereof, and transfer means overlying said record-keeping sheet means, said record-keeping sheet means having at least two transverse rows of perforations thereacross and same being easily separable therealong into more than two sections and one of said sections having thereacross immediately below one of said transverse rows of perforations a portion having a duplicate of said key indicia thereon and space for receiving thereon said bookkeeping information, more than two of said sections positioned to receive indicia entered on said upper sheet and constructed and adapted when separated to be mounted by said adhering means on accounting sheets, said one of said sections being mountable on said accounting sheets by some of said adhering means across the lower portions thereof in hinged relation to said accounting sheets and overlying a like one of said sections mounted on said accounting sheets and with the resulting notched edge along and adjacent to the lower extent of the portion having the key indicia thereon so that said last-named indicia is exposed and so that said one of said sections can be raised up in its upper portion to view thereunder other indicia on said like one of said sections below the portions thereon having the key indicia.

2. The manifold pack of claim 1 wherein said intermediate record-keeping sheet means comprises at least two sheets in overlying relation and having between said two sheets transfer means.

3. The manifold pack of claim 1 wherein said lower sheet thereof has in the upper portion two spaced apertures therethrough.

References Cited by the Examiner
UNITED STATES PATENTS

| | | | |
|---|---|---|---|
| 1,203,902 | 11/1916 | Nichols | 282—23 |
| 1,634,240 | 6/1927 | Wilford | 282—27 X |
| 2,043,182 | 6/1936 | Lewis | 282—22 |
| 2,089,247 | 8/1937 | Benson | 282—23 |
| 2,374,695 | 5/1945 | Murray | 129—16.8 |
| 2,581,895 | 1/1952 | Wilson | 282—23 |
| 2,653,831 | 9/1953 | Dickson | 282—23 |
| 2,668,065 | 2/1954 | English et al. | 282—23 |
| 2,687,902 | 8/1954 | Becker | 282—23 |
| 2,980,446 | 4/1961 | Moss | 282—22 |

EUGENE R. CAPOZIO, *Primary Examiner.*

LAWRENCE CHARLES, *Examiner.*